United States Patent [19]

Iino

[11] Patent Number: 4,962,998
[45] Date of Patent: Oct. 16, 1990

[54] INDICATION DISPLAY UNIT FOR VEHICLES

[75] Inventor: Tadashi Iino, Shizuoka, Japan

[73] Assignee: Yazaki Corporation, Tokyo, Japan

[21] Appl. No.: 240,664

[22] Filed: Sep. 6, 1988

[30] Foreign Application Priority Data

Sep. 7, 1987 [JP] Japan .................................. 62-222011

[51] Int. Cl.$^5$ .............................................. G02B 27/14
[52] U.S. Cl. .................................... 350/174; 350/605;
340/705; 353/14
[58] Field of Search ................. 350/174, 605; 340/705,
340/980, 97, 98; 353/13, 14

[56] References Cited

U.S. PATENT DOCUMENTS

| | | | |
|---|---|---|---|
| 4,294,515 | 10/1981 | Kaufman | 350/174 |
| 4,632,508 | 12/1986 | Connelly | 340/705 |
| 4,742,389 | 5/1988 | Schiffman | 340/705 |
| 4,775,218 | 10/1988 | Wood et al. | 350/174 |
| 4,787,711 | 11/1988 | Suzuki et al. | 350/174 |
| 4,831,366 | 5/1989 | Iino | 340/705 |
| 4,837,551 | 6/1989 | Iino | 340/705 |

FOREIGN PATENT DOCUMENTS

| | | | |
|---|---|---|---|
| 0229876 | 7/1987 | European Pat. Off. | 340/705 |
| 3527079 | 1/1986 | Fed. Rep. of Germany | 350/605 |
| 60-0157939 | 8/1985 | Japan | 350/605 |
| 60-0179715 | 9/1985 | Japan | 340/705 |
| 62-0137236 | 6/1987 | Japan | 340/705 |
| 2203833 | 10/1988 | United Kingdom | 340/705 |

OTHER PUBLICATIONS

Jenkins et al., "Fundamentals of Optics", Third Edition, copyright 1957, McGraw-Hill Book Company, Inc., pp. 46, 47 and 82–97.

Primary Examiner—Rodney B. Bovernick
Assistant Examiner—R. D. Shafer
Attorney, Agent, or Firm—Armstrong, Nikaido, Marmelstein, Kubovcik & Murray

[57] ABSTRACT

An indication display unit for vehicles which enables a driver to sight an indication image comprises an image projector device including an indicating means, a light source and an optical system for the image projector, a projecting surface means having a concave surface in front of driver's seat with a predetermined interval, and means for making an image of indications projected from the image projector at the point of driver's eyes.

4 Claims, 4 Drawing Sheets

INDICATION DISPLAY UNIT FOR VEHICLES

BACKGROUND OF THE INVENTION

1. Field of the Invention

The present invention relates to an indication display unit for displaying velocity, revolution number or the like in vehicles, and more particularly to a display unit equipped with a head-up projector for displaying an image projected to a semi-translucent mirror, a windshield or the like located in front of a driver seat.

2. Description of the Prior Art

Various indication display units for vehicles provided with such a head-up display (hereinafter refer to "HUD") have been suggested by now. The most widely used HUD type indication display unit comprises a display device such as LCD cell, a light source and an optical system for image projection, and a projecting surface composed of a windshield or a semi-translucent mirror located in front of it so as to project an image to the projecting surface. However, since the projecting surface of such HUD is flat, when the driver's eyes are averted from the front forward direction of the car, for example when the car is turning round a curve, or generally when the position of the eye level is inclined too much towards right or left due to the difference of the driving style of each driver, there are occasions in which the displayed image can be hardly seen on the projecting surface. Specially when a lens is used to put the indicating image farther ahead, the visible range of the indicating image becomes much narrower.

Problems to be Solved.

It is an object of the present invention to eliminate the foregoing difficulties in the conventional display unit, and to provide an HUD type display unit for vehicles, which is capable of having the driver view the indicating image at any eye level.

Means to solve the problem

In order to attain the above object the present invention provides an indication display unit characterized in that the projecting surface has a concave curvature whose center of curvature 0 is positioned in a point made by a bisector of PQP' intersecting the line PP' wherein P stands for the mounting position of a projector device, Q a reflecting point on a projecting surface, and P' the position of driver's eye in the normal seating position.

Advantage of the Invention

As shown above, the present invention is provided with a concave surface, on which an indicating image is projected, having a preset point as its center of curvature.

Thus, even when the driver's eyes are shifted away from the front forward direction of the vehicle, as the distance between his eyes and the projecting surface remains the same; the driver can still sight the indicating image and can consequently obtain a much wider visual field of the projected indicating image.

BRIEF DESCRIPTION OF THE INVENTION

For the better understanding of the invention, reference will be made, by way of example, to the accompanying drawings, in which;

FIG. 1 is a schematic side view of a first embodiment according to this invention in the whole structure, FIG. 2 a schematic plan view of FIG. 1 when the car is running straight forward, FIG. 3 another schematic plan view of FIG. 1 when the car turns round to the left, and FIG. 4 is a schematic side view of a second embodiment of this invention.

DETAILED DESCRIPTION OF THE EMBODIMENT

Figure 1:
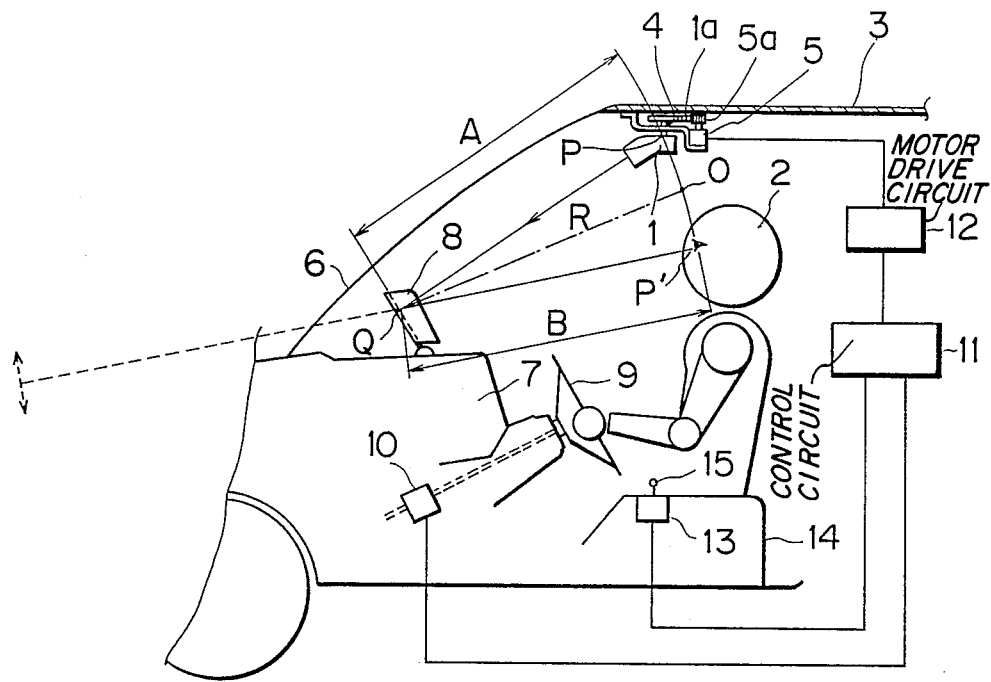
Figure 2:
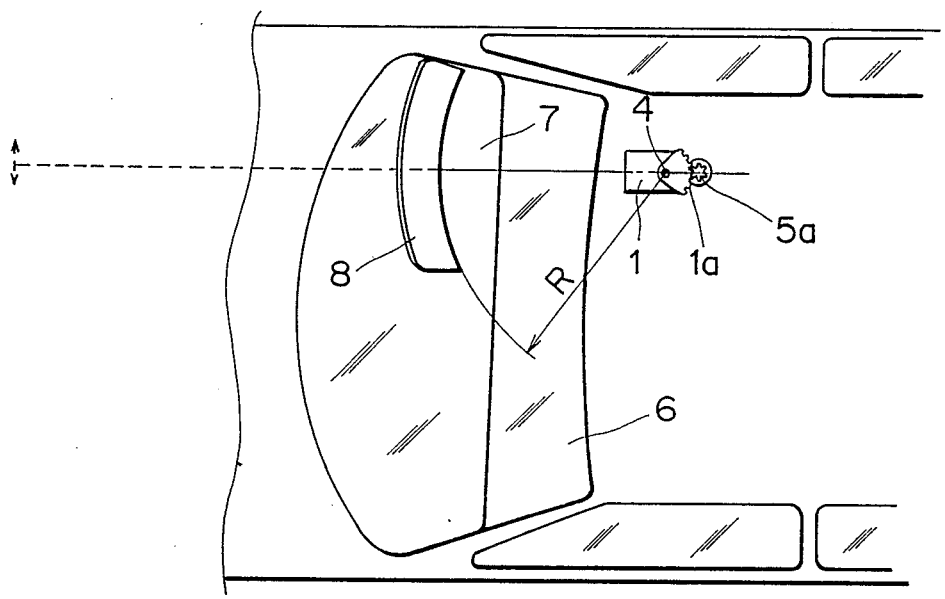
Figure 3:
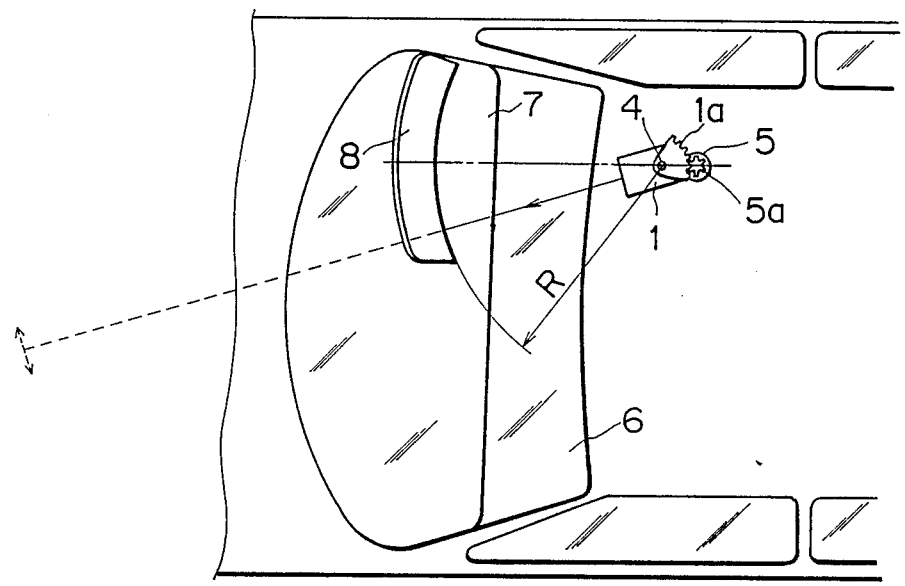

FIG. 1 denotes a schematic side view of an embodiment according to this invention, and FIG. 2 its plan view.

The projecting device 1 is an already known device composed of a display device such as an LCD cell, a light source and a projecting lens, and is rotatably mounted at the ceiling 3 with a shaft 4 right above the driver 2. The projecting device 1 is provided with a gear 1a, and a motor 5 provided with a driving gear 5a to be engaged with the above gear 1a is fixed to the ceiling 3 behind the projecting device 1.

A semi-translucent mirror 8, to which an indicating image is projected, is mounted on a top surface of the dash board 7 in front of the windshield 6. The mirror 8 is formed with its projecting side concaved as shown in FIG. 2, and its center and radius of curvature are obtained and calculated as below. If the mounting position of the image projecting device 1 (HUD) is P, eye level of the driver 2 is P', and the reflecting point on the mirror 8 is Q, then the mirror 8 must be situated on the circular arc surface, preferably spherical section area, having the radius OQ extending from the center of curvature O on the normal line that equalizes the angle of incidence <PQO and that of reflection <OQP', the center of curvature is obtained by the point of the normal line intersecting the line PP'. Accordingly, the driver 2 can acquire a right angle in which the reflected image is always towards his eye level P', after the projected image from the mounting position P of the projecting device 1 is reflected from the reflecting point on the mirror 8.

In other words, if the distance between the mounting position P of the projecting device 1 and the mirror 8 is A, and that between the mirror 8 and the eye level P' of the driver 2 is B1 then the following equation is realized;

$$\frac{1}{A} + \frac{1}{B} = \frac{2}{R} \ (OQ = R)$$

Accordingly, the radius of the curvature R is calculated by the following approximate formula (1)

$$R \simeq \frac{2A \cdot B}{A + B} \quad (1)$$

For example, if A=500 mm, and B=700 mm, then the required radius of curvature will be about 583 mm.

In such a display unit or system, even if the sight of driver's eyes angularly deflects when the automobile is making a curve, his eyes do not fail in catching the image. By the way, steering angle sensor 10 of the steering 9 is provided in the car, and the above sensor 10 is connected to the motor drive circuit 12 through the control circuit 11. The control circuit 11 can be any microcomputer, to which the data showing the relation among; the steering angle of the steering 9, the driver's looking direction, correct image forming position on the mirror, and the image projecting direction for the projecting device 1 is inputted so as to control the motor drive circuit 12 according to the data outputted from the steering angle sensor 10, and to rotate the motor 5 some degree to control clockwise or counterclockwise to settle the correct image projecting direction for the projecting device.

Furthermore, the console 14 situated at a side of the driver 2 contains the operation lever 15 of a display position adjusting circuit 13, and the same circuit 13 outputs signals equivalent to those of the above steering angle sensor 10 to the control circuit, so that the driver can settle the image forming position on the mirror according to his eye level by manually operating the control lever 15.

When the car is running straight ahead, the steering angle sensor 10 activates the control circuit 11 to output control signal to the motor drive circuit 12, and by this operation, the motor 5 is rotated to some degree in a desired direction in order to rotate the projecting device 1, so that the indicating image can be seen at the center portion of the mirror 8. Here, when the car comes across the curving road towards left, the steering angle sensor 10 detects its steering angle and transmits the data to the control circuit 11. The control circuit 11 processes the data by the preset data program, and sends the command to the motor drive circuit 12 to be activated. By this operation, the motor drive circuit 12 activates the motor 5 to rotate in a clockwise direction to some degree to correspond to the shifted angle, for example towards left against frontward of the car in order to rotate the projecting device 1 to required degree towards left via the gear 1a engaged with the gear 5a. Thus, the driver 2 can sight the displayed image on the mirror 8 the position shifted towards left. In other words, although the eyes of the driver 2 are shifted towards left, as the mirror half 8 is concavely formed, the driver 2 can still sight the displayed image on the approximately vertical projecting surface, just like as he can sight it at his front forward direction when the car is running straight ahead.

Figure 4:
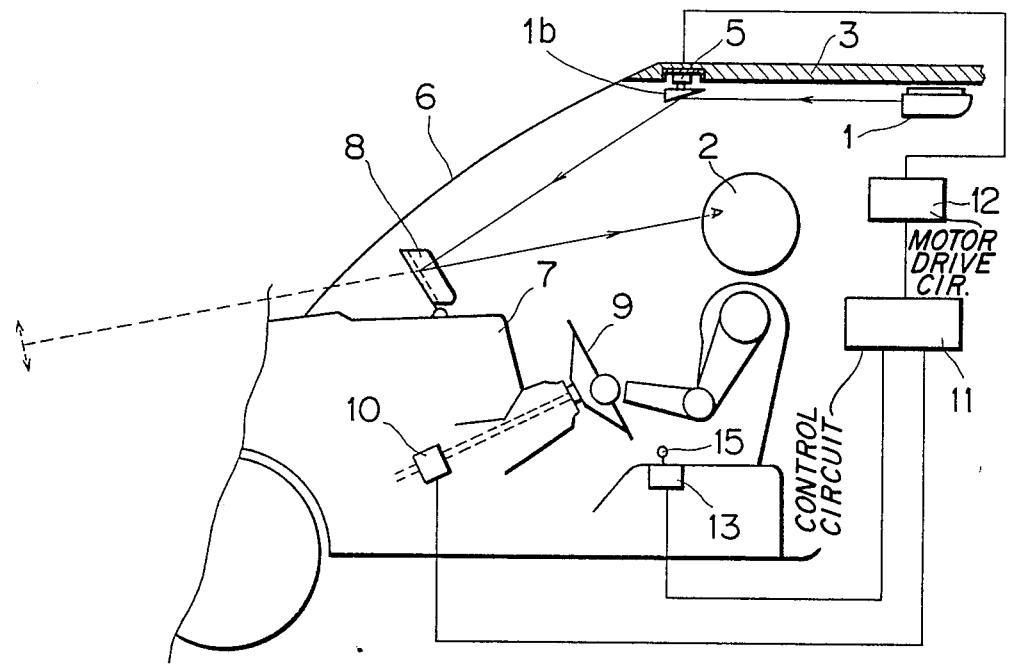

FIG. 4 denotes another embodiment according to the present invention, in which the projecting direction adjusting mirror 1b usually mounted in main body 1 of the projecting device is separated from the main body 1 and this mirror is mounted at the ceiling 3 of the car, and by rotating it by the motor 5, the projecting direction of the displayed image against the mirror 8 can be easily shifted. Means to control the mirror 1b is totally equal to that of the projecting device 1 in the first embodiment.

All these embodiments are related to HUD type, but the present invention is not limited to these, in other words, as far as the projecting surface of the display unit displays the projected image in front of the driver, any embodiment is practically utilizable.

While the invention has been particularly shown and described in reference to preferred embodiments thereof, it will be understood by those skilled in the art that changes in form and details may be made therein without departing from the spirit and scope of the invention.

What is claimed is:

1. An indication display unit for a vehicle for enabling a driver to sight an indication image comprising an image projector device having an indicating means, a light source and an optical system; a projecting surface means having a concave surface along its length for directly reflecting thereon the indication image from the image projector device to the driver and located in front of a driver's seat at a predetermined interval; and control means operably coupled to the image projector device for controlling a projected image of indications projected from the image projector device, said control means controls the projected image of indications dependent on the steering angle of the vehicle.

2. An indication display unit for a vehicle as claimed in claim 1, wherein said control means for controlling a projected image of indications includes means for adjusting the projecting angle of the image projector device.

3. An indication display unit for vehicles as claimed in claim 2, wherein said means for adjusting the projection angle of the image projector device includes a steering angle sensing means to thereby permit a driver to view the indication image at any eye level or position.

4. An indication display unit for vehicles as claimed in claim 3, wherein the concave curvature whose radius of curvature R is obtained by calculation in the following approximate formula (1):

$$R = \frac{2A \cdot B}{A + B}, \quad (1)$$

wherein A stands for the distance from the projecting device to the reflecting point of the projecting surface, and B is the distance from the reflecting point to the driver's eyes.

* * * * *